United States Patent
Chao

(10) Patent No.: US 7,548,663 B2
(45) Date of Patent: Jun. 16, 2009

(54) INTRA-FIELD INTERPOLATION METHOD AND APPARATUS

(75) Inventor: Po-Wei Chao, Taipei Hsien (TW)

(73) Assignee: Realtek Semiconductor Corp., HsinChu (TW)

( * ) Notice: Subject to any disclaimer, the term of this patent is extended or adjusted under 35 U.S.C. 154(b) by 607 days.

(21) Appl. No.: 10/711,037

(22) Filed: Aug. 19, 2004

(65) Prior Publication Data

US 2006/0039631 A1 Feb. 23, 2006

(51) Int. Cl.
*G06K 9/40* (2006.01)
*G06K 9/32* (2006.01)
*H04N 7/01* (2006.01)
*H04N 11/20* (2006.01)

(52) U.S. Cl. .......... 382/300; 382/261; 348/448
(58) Field of Classification Search .......... 382/293, 382/298–300; 348/448–450
See application file for complete search history.

(56) References Cited

U.S. PATENT DOCUMENTS

| 4,772,956 | A | * | 9/1988 | Roche et al. | ......... 358/426.01 |
| 5,347,599 | A | * | 9/1994 | Yamashita et al. | .......... 382/278 |
| 6,133,957 | A | | 10/2000 | Campbell | |
| 6,421,090 | B1 | | 7/2002 | Jiang et al. | |
| 6,965,705 | B1 | * | 11/2005 | Ma et al. | .......... 382/300 |
| 7,092,033 | B2 | * | 8/2006 | Hahn | .......... 348/458 |
| 7,206,027 | B2 | * | 4/2007 | De Haan et al. | .......... 348/448 |
| 2005/0073607 | A1 | * | 4/2005 | Ji et al. | .......... 348/448 |

* cited by examiner

*Primary Examiner*—Matthew C Bella
*Assistant Examiner*—Nathan Bloom
(74) *Attorney, Agent, or Firm*—Winston Hsu

(57) ABSTRACT

An intra-field interpolation method and apparatus for generating a target pixel value. The method includes the following steps of: receiving a plurality of pixel values of an image field; generating a first pixel difference set from the received pixel values using a first pixel difference algorithm; generating a second pixel difference set from the received pixel values using a second pixel difference algorithm; and blending the received pixel values according to the first pixel difference set and the second pixel difference set, to generate the target pixel value.

14 Claims, 5 Drawing Sheets

Up | [-4] | [-3] | [-2] | [-1] | [0] | [1] | [2] | [3] | [4]

X — Pixel to be interpolated

Down | [-4] | [-3] | [-2] | [-1] | [0] | [1] | [2] | [3] | [4]

Fig. 3

INTRA-FIELD INTERPOLATION METHOD AND APPARATUS

BACKGROUND OF INVENTION

1. Field of the Invention

The present invention relates to a method and apparatus for processing pixel values, and more specifically, to a method and apparatus of performing intra-field interpolation for generating interpolated pixel values.

2. Description of the Prior Art

Many television and video signals are interlaced, where the set of scan lines (typically 525 for NTSC color television) which make up a single video frame are not scanned or transmitted sequentially. Rather, the video frame is divided into two "fields", each field comprising every other scan line. In television, the scan lines comprising one field are transmitted first, followed by the scan lines of the second field.

However, a number of display devices, such as computer monitors, are not interlaced. Rather, these devices sequentially scan the entire display area, one scan line after another. To display an interlaced scanned sequence, such as a video signal, on such progressively scanned devices, a deinterlacing process must convert each separate field into a complete display frame that can be sequentially output to the display device. The main task of a deinterlacing process is to reconstruct the missing line between each of the scan lines of an interlaced field.

There are two primary deinterlacing methods, each with their own strengths and weaknesses. "Inter-field" techniques simply merge the data from the second field with the data from the first field to produce a completed frame. If there is no motion in the video frame, such methods yield an ideal reconstituted picture. Vertical resolution can be as good as an original noninterlaced frame. However, if there is motion within the video signal, motion effects will generally be visible to the human eye. Motion effects arise when an object, which was in one location during the scanning of the first field, has moved when the alternating scan lines of the second field are scanned. Simply combining the interlaced scan lines of the two fields yields an unacceptable rendition of the object.

"Intra-field" techniques use data only from a single field to produce a complete frame. Such methods are better suited for video frames having motion. With an intra-field technique, the values for non-existent pixels are interpolated from pixel values in the scan lines above and below the non-existent pixels. While this technique produces no deleterious motion effect, since it does not incorporate motion from one field to the next, it also does not enhance vertical resolution, since it merely interpolates from existing pixel values within a single field and does not use pixel information for missing scan lines from the second field. Also, simple intra-field deinterlacing techniques (such as simple vertical interpolation) tend to generate unacceptable jagged pictures along diagonal edges.

SUMMARY OF INVENTION

It is therefore one of objectives of the present invention to provide an intra-field interpolation method and apparatus for effectively and accurately generating the interpolated pixel value.

According to embodiments of the present invention, an intra-field interpolation method for generating a target pixel value is disclosed. The method comprises: receiving a plurality of pixel values of an image field; generating a first pixel difference set from the received pixel values using a first pixel difference algorithm; generating a second pixel difference set from the received pixel values using a second pixel difference algorithm; and blending the received pixel values according to the first pixel difference set and the second pixel difference set, to generate the target pixel value.

These and other objectives of the claimed invention will no doubt become obvious to those of ordinary skill in the art after reading the following detailed description of the embodiments that is illustrated in the various figures and drawings.

BRIEF DESCRIPTION OF DRAWINGS

FIG. 3 is a diagram illustrating a plurality of pixel values in an upper line and a lower line of the pixel to be interpolated.

DETAILED DESCRIPTION

Figure 1:
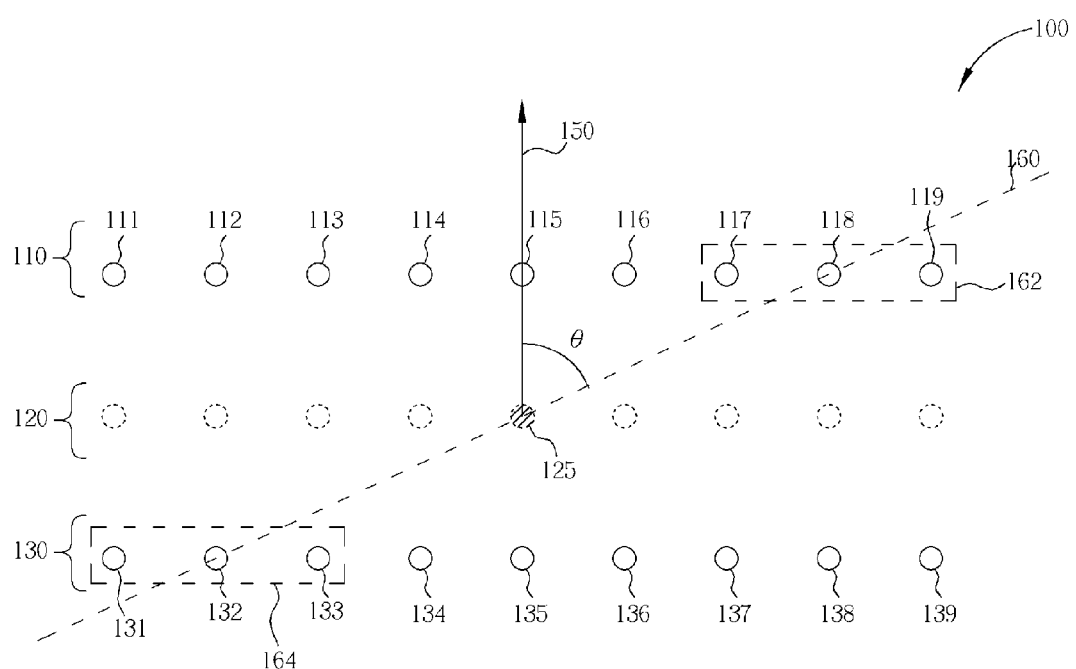
FIG. 1 is a portion of an image comprising pixels arranged in rows.

Please refer to FIG. 1. FIG. 1 illustrates a portion of an image 100 comprising pixels arranged in rows (or lines.) Pixels 111-119 are arranged in one line 110 of the image 100 and pixels 131-139 are arranged in another line 130 of the image 100. As is well known, the lines 110 and 130 shown in FIG. 1 belongs to the same field (e.g., the even field or the odd field) of the image 100. As will be detailed in the following descriptions, by implementing embodiments of the present invention, the resolution of the image is to be enhanced by generating additional pixels between the two lines of pixels on a pixel-by-pixel basis using intra-field interpolation during de-interlacing process. The figure and following discussion describe the generation of additional pixel 125. Please note that, although the intra-field interpolation method and apparatus to be described herein focus on a de-interlacing application, they can also be implemented in other applications wherever suitable.

Figure 2:
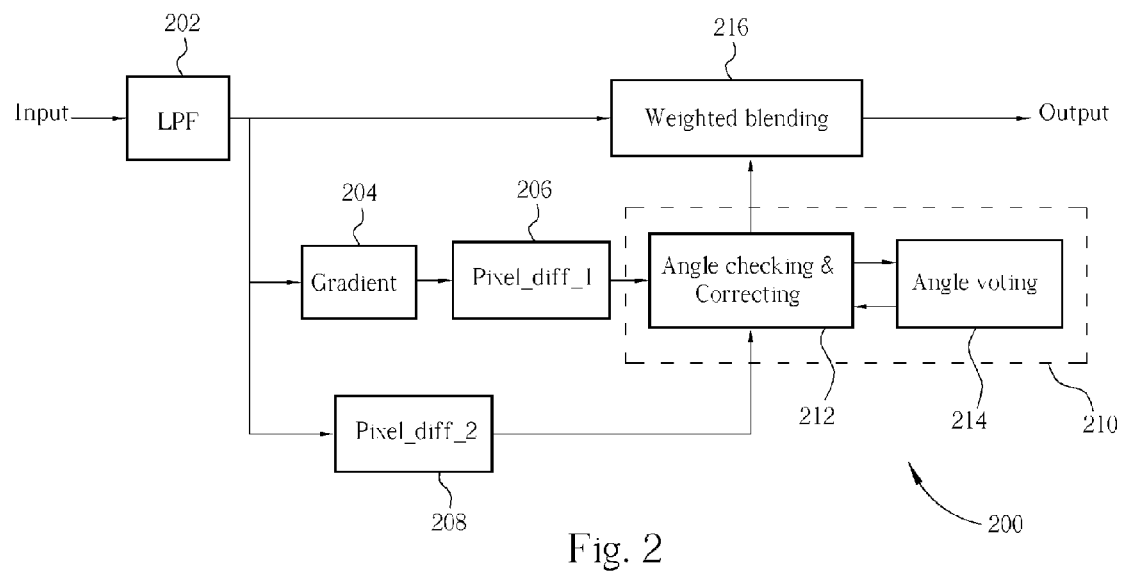
FIG. 2 is an intra-field interpolation apparatus according to an embodiment of the present invention.

Please refer to FIG. 2. FIG. 2 illustrates an intra-field interpolation apparatus 200, which may be embedded in a deinterlacing engine, according to an embodiment of the present invention. The intra-field interpolation apparatus 200 receives an interlaced input signal, and generates a corresponding de-interlaced output signal. The apparatus 200 comprises a low-pass filtering unit 202, which filters the input signal to reduce noise effect; a first pixel difference unit 206, which adopts a first pixel difference algorithm, and in this embodiment, references a result of a gradient unit 204, to generate a first pixel difference set from the filtered input signal; a second pixel difference unit 208, which adopts a second pixel difference algorithm to generate a second pixel difference set from the filtered input signal; an angle determining unit 210, in this embodiment composed of an angle checking and correcting unit 212 and an angle voting unit 214, which determines an optimal angle according to the results of the first pixel difference unit 206, the second pixel difference unit 208, and/or the angle voting unit 214; and a weighted blending unit 216, which weighted blends, in this embodiment through interpolation, pixel values in the interlaced input signal (e.g., pixel values in the lines 110, 130) to generate de-interlaced output signal (e.g., the additional pixel 125.)

First of all, the operation of the low-pass filtering unit 202 will be described. The purpose of adopting a low-pass filtering operation before any further processing to the incoming data usually includes noise suppression or image smoothening. A typical low-pass filtering operation may include, for each incoming pixel, incorporating influence of adjacent pixels thereto, and an example may read as follows:

low_pass_value=[previous_value+2×current_value+next_value]

wherein low_pass_value is a low-pass filtered version of a currently incoming pixel value (i.e., current_value,) while previous_value, current_value, and next value are three consecutively incoming pixel values (e.g., pixels 111, 112, 113 in FIG. 1.) Please note that, as is well known to those of ordinary skill in the art, the above-mentioned low-pass filtering operation serves only as one example, and other low-pass filtering algorithm may be substituted in where the application sees fit.

For the following descriptions, the convention shown in FIG. 3 is to be adopted. The pixel values that is to be input to the gradient unit 204, the second pixel difference unit 208, and the weighted blending unit 216, are respectively labeled Up[x] and Down[x], wherein x=−4, . . . , 0, . . . , 4, as shown in FIG. 3. In this embodiment, these pixel values may be the low-pass filtered version of the corresponding pixels 111-119 in the line 110 and pixels 131-139 in the line 130.

In this embodiment, before the operation of the first pixel difference unit 206, the gradient unit 204 first operates to determine if the gradient of pixel values in the upper line (e.g., the line 110) and the gradient of pixel values in the lower line (e.g., the line 130) of a current pixel to be interpolated (e.g., the additional pixel 125) possess certain characteristics. Here such an operation of the gradient unit 204 is implemented by excluding certain situations. The gradient unit 204 first checks to determine the values of a set of parameters GradUp [x], x=−3, . . . , 0, . . . , 4, each of which is representative of a gradient status between two corresponding pixels in the upper line (e.g., GradUp[−3] corresponds to pixel values Up[−4] and Up[−3], and so on.) In this embodiment, the following operations are performed to determine GradUp[x]:

If (Up[x]−Up[x−1]>Thl_P)

GradUp[x]=1

Else if (Up[x]−Up[x−1]<Thl_N)

GradUp[x]=−1

Else

GradUp[x]=GradUp[x−1]

wherein Thl_P and Thl_N are threshold values, with nominal values of 15 and 15. Similar operations can be performed on the pixel values Down[x] to render another set of parameters GradDown[x]. Then, the gradient unit 204 checks the following two situations: either when GradUp[x] or GradDown[x] contains sign toggling among element parameters, or when GradUp[x] and GradDown[x] does not contain sign toggling, but are of the same tendency (i.e., both of all 1s or all 1s,) is a parameter Gradient set to have a value of 0. Otherwise the parameter Gradient is set to have a value of 1.

Please note that the above-mentioned embodiment gradient unit 204 only serves as an example. It should be appreciated by those of ordinary skill in the art that other algorithms, such as the well-known Sobel algorithm, may be adopted to serve the purpose of the gradient unit 204 in this invention.

After the value of the parameter Gradient has been determined, the first pixel difference unit 206 will operate to calculate a first pixel difference set, and to determine two angles, one on either side of a normal axis 150, according to the parameter Gradient as well as the first pixel difference set. According to this embodiment, the following pixel difference calculation is performed for each of a plurality of pairs of pixel sets in the upper line 110 and the lower line 130, to generate an element of the first pixel difference set first_diff [x]:

first_diff[x]=|Up[x+1]−Down[−x+1]|+|Up[x]−Down[−x]|+|Up[x−1]−Down[−x−1]| wherein x=−3, . . . , 0, . . . , 3, as an example. The above function of the first pixel difference set reads the sum of absolute differences (SAD) between a pair of pixel sets each in the upper line 110 and in the lower line 130 (e.g., the pixel set 162 with pixels 117, 118, 119, and the pixel set 164 with pixels 131, 132, 133, and so on.) Here the pair of pixel sets resides on a virtual axis 160 through the pixel to be interpolated 125, forming an angle θ with the normal axis 150.

After all the elements in first_diff[x] has been found, the following operation is performed to determine, on either side of the normal axis 150, a pair of pixel sets (or a corresponding angle), which results in two angle values coming out of the first pixel difference unit 206. If Gradient=0, find a pair of pixel sets (i.e., an angle) with the smallest first_diff[x] value, which satisfies the following condition:

Min(Up[0], Down[0])

≦

(Up[x]+Down[x])/2

≦

Max(Up[0], Down[0]), wherein Min is the minimum function, and Max is the maximum function; while if Gradient=1, find a pair of pixel sets (i.e., an angle) with the smallest first_diff[x] value. That is, when the gradient situation of the upper line 110 and the lower line 130 of the pixel to be interpolated 125 is deemed to have certain characteristics (i.e., Gradient=1), an angle with the smallest first_diff[x] value is selected without any further limitations. Otherwise, an angle with the smallest first_diff[x] is selected with a further boundary limitation, which requires the average of two pixel values on the selected axis (i.e., Up[x] and Down [x]) falls between the pixel values of the two pixels on the normal axis 150 (i.e., Up[0] and Down[0].) As such, two angle values, $\theta_1$ on the right side (which corresponds to a right pixel difference Right_Pixel_Diff), and $\theta_2$ on the left side (which corresponds to a left pixel difference Left_Pixel_Diff) of the normal axis 150, are determined.

It is to be noted that although in this embodiment each pixel set in the pair is organized to contain 3 pixels, such number of pixels in the pixel set does not serve as limitation of the invention. Furthermore, the first pixel difference unit 206 adopting a strategy of selecting minimal SAD, partially with a further boundary limitation, also merely serves as an embodiment of the invention, and should not be deemed as limitation.

Along with the operations of the gradient unit 204 and the first pixel difference unit 206, the second pixel difference unit 208 also operates to generate a second pixel difference set, according to an alternative pixel difference algorithm than the first pixel difference unit 206. In this embodiment, the second pixel difference unit 208 performs the following operation, which may be termed as "reference pixel difference algorithm", to render a second pixel difference set which includes two reference pixel differences Right_Ref_Diff and Left_Ref_Diff:

Ref_Prev=(Up[−1]+Down[−1])/2

Ref_Cur=(Up[0]+Down[0])/2

Ref_Next=(Up[1]+Down[1])/2

Right_Ref_Diff=(|Up[0]−Ref_Prev|+|Down(−2)−
 Ref_Prev|)+2×(|Up[1]−Ref_Cur|+|Down(−1)−
 Ref_Cur|)+(|Up[2]−Ref_Next|+|Down(0)−
 Ref_Next|)

Left_Ref_Diff=(|Up[−2]−Ref_Prev|+|Down(0)−Ref_
 Prev|)+2×(|Up[−1]−Ref_Cur|+|Down(1)−
 Ref_Cur|)+(|Up[0]−Ref_Next|+|Down(2)−
 Ref_Next|)

wherein Right_Ref_Diff indicates an SAD with respect to a plurality of reference pixel values (i.e., Ref_Prev, Ref_Cur, and Ref_Next,) of a pair of pixel sets (here, Up[0] to Up[2] and Down[−2] to Down[0]) along an angle on the right side of the normal axis 150 (here, 45 degrees,) whereas Left_Ref_Diff along an angle on the left side of the normal axis 150 (here, −45 degrees.)

Also to be noted is that the second pixel difference unit 208 adopting the above-mentioned "reference pixel difference algorithm" serves merely as an embodiment of the invention, and should not be deemed as limitation. Other algorithms, when properly adapted to the purpose of the second pixel difference unit 208, may also be utilized.

Figure 4:
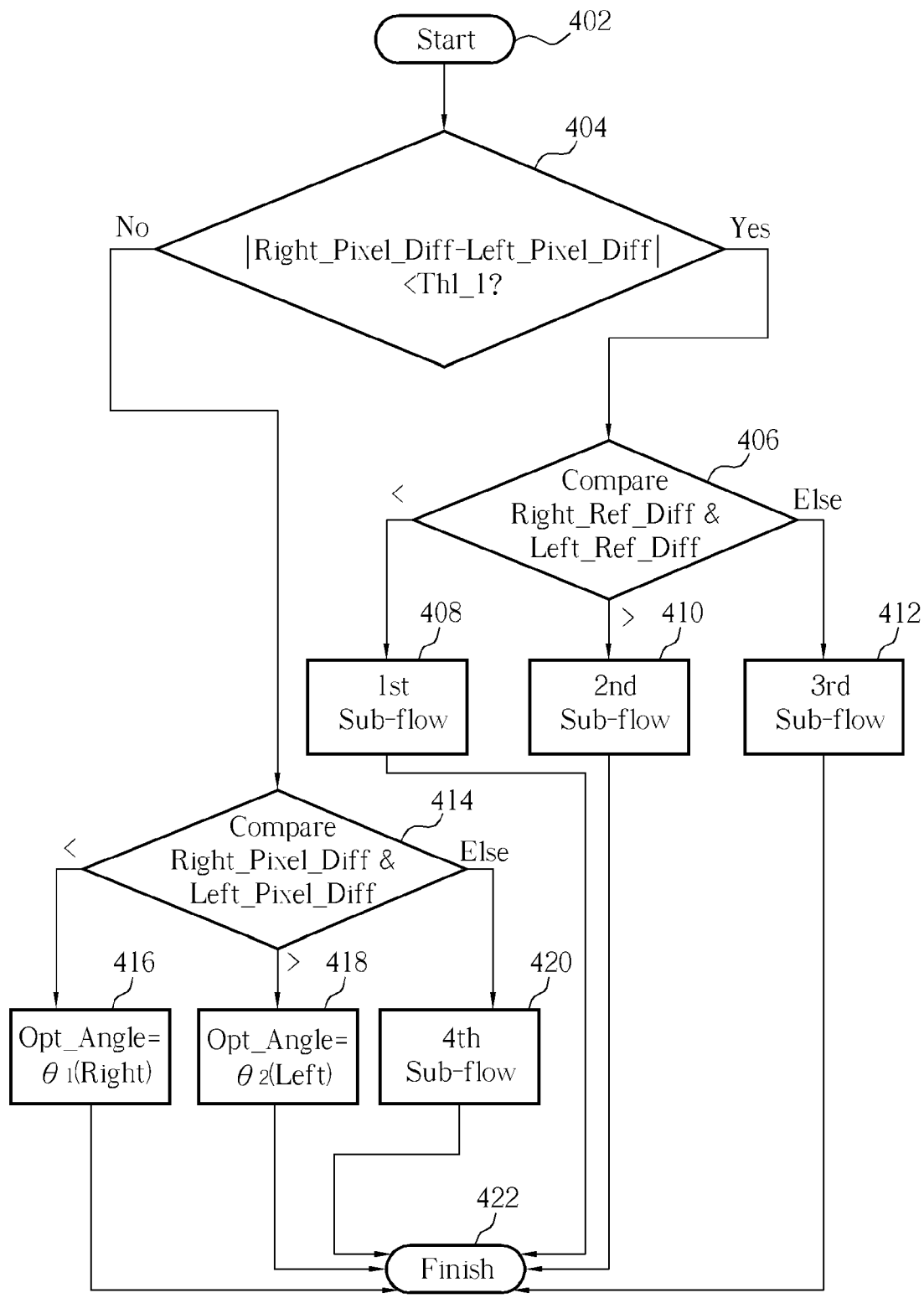
FIG. 4 is a flowchart of the operation of the angle determining unit 210 according to an embodiment of the present invention.

After the operations of the first pixel difference unit 206 and the second pixel difference unit 208, at least the parameters Right_Pixel_Diff (which corresponds to $\theta_1$,) Left_Pixel_Diff (which corresponds to $\theta_2$,) Right_Ref_Diff, and Left_Ref_Diff are passed to the angle checking and correcting unit 212, and the angle checking and correcting unit 212 will operate, according to these parameters, in conjunction with the operation of the angle voting unit 214, to determine an optimal angle Opt_Angle. The angle voting unit 214 operates to compare an angle at issue together with two stored angles, Pre_Angle and Pre_Pre_Angle, from the checking and correcting operation corresponding to two previous pixels, and it is to be noted that the angles stored in the angle voting unit 214 are those values before the correcting operation by the angle checking and correcting unit 212. Please refer to FIG. 4, which illustrates a flowchart of the operation of the angle determining unit 210, and includes the following steps:

Step 402: Start the flow;

Step 404: Check to see if the statement |Right_Pixel_Diff−Left_Pixel_Diff|<Thl_1 is true, wherein Thl_1 is a threshold value with a nominal value of 80. If it is true, perform Step 406; otherwise perform Step 414. In this embodiment, when the two parameters Right_Pixel_Diff and Left_Pixel_Diff from the first pixel difference unit 206 are too close to each other, it is considered insufficient to determine the optimal angle Opt_Angle by referencing to the result of the first pixel difference algorithm alone, and results of other additional pixel difference algorithm(s), here, the output of the second pixel difference unit 208, is sought to be resorted to;

Step 406: Compare the parameters Right_Ref_Diff and Left_Ref_Diff. If Right_Ref_Diff<Left_Ref_Diff, perform Step 408; if Right_Ref_Diff>Left_Ref_Diff, perform Step 410; otherwise perform Step 412;

Step 408: Perform a first sub-flow, which will be detailed in the following paragraphs;

Step 410: Perform a second sub-flow, which will be detailed in the following paragraphs;

Step 412: Perform a third sub-flow, which will be detailed in the following paragraphs;

Step 414: Compare the parameters Right_Pixel_Diff and Left_Pixel_Diff. If Right_Pixel_Diff<Left_Pixel_Diff, perform Step 416; if Right_Pixel_Diff>Left_Pixel_Diff, perform Step 418; otherwise perform Step 420;

Step 416: Set the optimal angle Opt_Angle=$\theta_1$, which is the one of the two angles on the right side output from the first pixel difference unit 206, and corresponds to the right pixel difference Right_Pixel_Diff;

Step 418: Set the optimal angle Opt_Angle=$\theta_2$, which is the one of the two angles on the left side output from the first pixel difference unit 206, and corresponds to the left pixel difference Left_Pixel_Diff;

Step 420: Perform a fourth sub-flow, which will be detailed in the following paragraphs; and Step 422: Finish the flow.

For the first sub-flow mentioned above, the following operations are performed in this embodiment to determine the optimal angle Opt_Angle when Right_Ref_Diff<Left_Ref_Diff in Step 406:

If (Gradient==1 && |Right_Ref_Diff−Left_Ref_Diff|<Thl_2 && Pre_Angle==Pre_Pre_Angle==$\theta_2$ [including 0 degree, i.e., the normal direction])

Opt_Angle=$\theta_2$

Else

If (|Right_Ref_Diff−Left_Ref_Diff|<Thl_2 && Pre_Angle==Pre_Pre_Angle==$\theta_2$ [not including 0 degree, i.e., the normal direction])

Opt_Angle=$\theta_2$

Else

Opt_Angle=$\theta_1$ wherein Thl_2 is a threshold value with a nominal value of 30. Please note that in this embodiment, the parameter Gradient from the gradient unit 204, the selected angles $\theta_1$, $\theta_2$ by the first pixel difference unit 206, and the parameters Right_Ref_Diff, Left_Ref_Diff are all incorporated into the first sub-flow to determine the optimal angle Opt_Angle. Furthermore, a so-called "voting mechanism" referencing two previous angles together with a current angle (here, $\theta_2$) performed by the angle voting unit 214 is also utilized.

For the second sub-flow mentioned above, the following operations are performed in this embodiment to determine the optimal angle Opt_Angle when Right_Ref_Diff>Left_Ref_Diff in Step 406:

If (Gradient==1 && |Right_Ref_Diff−Left_Ref_Diff|<Thl_2 && Pre_Angle==Pre_Pre_Angle==$\theta_1$ [including 0 degree, i.e., the normal direction])

Opt_Angle=$\theta_1$

Else

If (|Right_Ref_Diff−Left_Ref_Diff|<Thl_2 && Pre_Angle==Pre_Pre_Angle==$\theta_1$ [not including 0 degree, i.e., the normal direction])

Opt_Angle=$\theta_1$

Else

Opt_Angle=$\theta_2$

Similarly, please note that in this embodiment, the parameter Gradient from the gradient unit 204, the selected angles $\theta_1$, $\theta_2$ by the first pixel difference unit 206, and the parameters Right_Ref_Diff, Left_Ref_Diff are likewise incorporated into the second sub-flow to determine the optimal angle Opt_Angle. Furthermore, a voting mechanism similar to the above-mentioned referencing two previous angles together with a current angle (here, $\theta_1$) performed by the angle voting unit 214 is also utilized.

For the third sub-flow mentioned above, the following operations are performed in this embodiment to determine the optimal angle Opt_Angle when Right_Ref_Diff=Left_Ref_Diff in Step 406:

If ($\theta_1==\theta_2$)
Opt_Angle=either one of $\theta_1$ and $\theta_2$
Else
If (Right_Pixel_Diff<Left_Pixel_Diff)
Opt_Angle=$\theta_1$
Else if (Right_Pixel_Diff>Left_Pixel_Diff)
Opt_Angle=$\theta_2$
Else
If (Pre_Angle==$\theta_1$)
Opt_Angle=$\theta_1$
If (Pre_Angle==$\theta_1$)
Opt_Angle=$\theta_2$
Else
Opt_Angle=either one of $\theta_1$ and $\theta_2$ For the fourth sub-flow mentioned above, the following operations are performed in this embodiment to determine the optimal angle Opt_Angle when Right_Pixel_Diff Left_Pixel_Diff in Step 414:

If (Pre_Angle==$\theta_1$)
Opt_Angle=$\theta_1$
If (Pre_Angle==$\theta_1$)
Opt_Angle=$\theta_2$
Else
Opt_Angle=either one of $\theta_1$ and $\theta_2$ After the optimal angle Opt_Angle has been determined in the angle determining unit 210, the optimal angle so determined and the pixel difference value (labeled Angle_Pixel_Diff) corresponding to the optimal angle generated by the first pixel difference unit 206 are passed to the weighted blending unit 216 for further operation. In this embodiment, the weighted blending unit 216 operates to weighted blend (or interpolate) pixel information along the selected optimal angle Opt_Angle and pixel information along the normal axis, so as to render the pixel to be interpolated. The pixel information along the optimal angle and the normal axis is weighted according to certain weighting algorithm, and in this embodiment, a two-phase weighting algorithm is used in the weighted blending unit 216. Please note that, in order to clearly describe the weighted blending operation, the optimal angle Opt_Angle is assumed to have a value of 45 degrees. That is, the optimal angle is selected corresponding to a virtual axis extending along a line connecting the pixels Up[1] and Down[−1].

Before detailing such two-phase weighting algorithm, the following parameters are first defined:

Normal_Average_Pixel=(Up[0]+Down[0])/2
Angle_Average_Pixel=(Up[1]+Down[−1])/2
Normal_Pixel_Diff=|Up[−1]−Down[−1]|+|Up[0]−Down[0]|+|Up[1]−Down[1]|
Diff=|Angle_Pixel_Diff−Normal_Pixel_Diff| wherein the parameter Normal_Average_Pixel is an average result of a plurality of pixel values along the normal axis, the parameter Angle_Average_Pixel is an average result of a plurality of pixel values along the optimal angle, and the parameter Diff is the absolute difference of the parameters Angle_Pixel_Diff and Normal_Pixel_Diff. It should be appreciated by those of ordinary skill in the art, that the averaging algorithms shown above serve merely as an example, and other averaging schemes may be used when the designer finds suitable.

Figure 5:
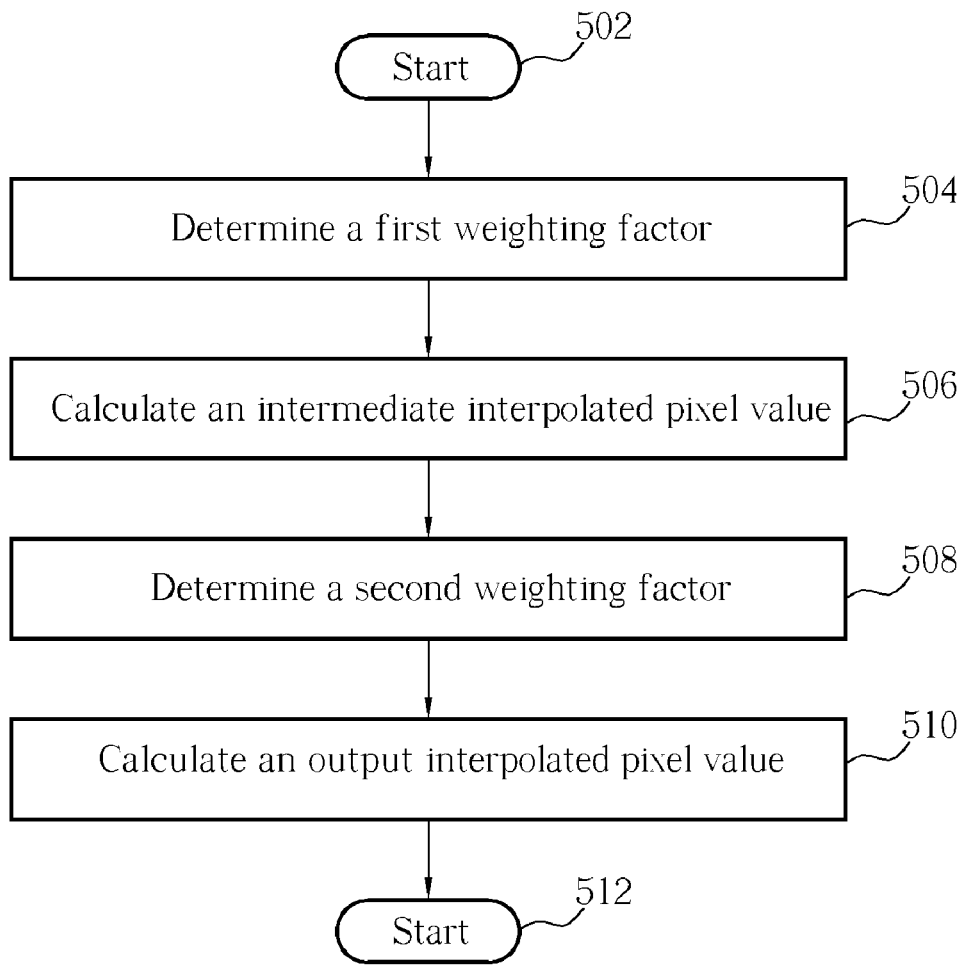
FIG. 5 is a flowchart of a weighted blending algorithm adopted by the weighted blending unit 216 according to an embodiment of the present invention.

Please refer to FIG. 5, which illustrates a flowchart of a weighted blending algorithm adopted by the weighted blending unit 216 according to an embodiment of the present invention. According to FIG. 5, the following steps are performed:

Step 502: Start the weighted blending algorithm;

Step 504: Determine a first weighting factor Weight_1. In this embodiment, Weight_1 is determined by comparing the parameter Angle_Pixel_Diff with a lower threshold value Thl_Down_1, with a nominal value of 20, and an upper threshold value Thl_Up_1, with a nominal value of Normal_Pixel_Diff, as follows:

If (Thl_Down_1 $\geq$ Angle_Pixel_Diff)
Weight_1=0
Else if (Angle_Pixel_Diff $\geq$ Thl_Up_1)
Weight_1=1
Else
Weight_1=

$$\frac{\text{Angle\_Pixel\_Diff} - \text{Thl\_Down\_1}}{\text{Thl\_Up\_1} - \text{Thl\_Down\_1}}$$

Step 506: Calculate an intermediate interpolated pixel value Interpolation_Pixel_1 using Normal_Average_Pixel and Angle_Average_Pixel according to the first weighting factor Weight_1, as follows:

Interpolation_Pixel_1=Normal_Average_Pixel×Weight_1+Angle_Average_Pixel×(1−Weight_1)

Step 508: Determine a second weighting factor Weight_2. In this embodiment, Weight_2 is determined by comparing the parameter Diff with a lower threshold value Thl_Down_2, with a nominal value of 0, and an upper threshold value Thl_Up_2, with a nominal value of 100, as follows:

If (Thl_Down_2 $\geq$ Diff)
Weight_2=0
Else if (Diff $\geq$ Thl_Up_2)
Weight_2=1
Else
Weight_2=

$$\frac{\text{Diff}}{\text{Thl\_Up\_2} - \text{Thl\_Down\_2}}$$

Step 510: Calculate an output interpolated pixel value Interpolation_Pixel_2 using the intermediate interpolated pixel value Interpolation_Pixel_1 and the parameter Angle_Average_Pixel according to the second weighting factor Weight_2, as follows:

Interpolation_Pixel_2=Interpolation_Pixel_1×(1−Weight_2)+Angle_Average_Pixel×Weight_2

Step 512: Finish the weighted blending algorithm.

The output interpolated pixel value Interpolation_Pixel_2 is then transmitted as output to the succeeding circuitry. As a result of the aforementioned embodiment of the invention, an intra-field interpolation method and apparatus have been provided to more adequately account for the intra-field interpolation mechanism in the de-interlacing application, as well as in other image processing applications.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An intra-field interpolation device for converting an interlaced video signal to a de-interlaced video signal, the device comprising:
    a gradient unit receiving an image field for determining a gradient of a first line above a target pixel in the image field and a second line below the target pixel in the image field;
    a first pixel difference unit receiving the image field of the interlaced video signal for determining a pair of pixel difference sets on either side of a normal axis of the target pixel in an alternate field of the interlaced video to thereby generate two candidate blending angles for the target pixel, wherein the first pixel difference unit is for generating the two candidate blending angles for the target pixel further according to the gradient;
    a second pixel difference unit receiving the image field for determining two reference pixel differences in the image field being along a reference angle on either side of the normal axis of the target pixel;
    an angle selection unit being coupled to the first pixel difference unit and the second pixel difference unit for determining an optimal blending angle according to the two candidate blending angles determined by the first pixel difference unit, and the two reference pixel differences determined by the second pixel difference unit; and
    a weighted blending unit being coupled to the angle selection unit and receiving the image field for blending a plurality of pixel values in the image field along the optimal blending angle to thereby generate the target pixel in the de-interlaced video signal.

2. The device of claim 1, wherein the second pixel difference unit is for determining the two reference pixel differences being along a 45 degree reference angle on either side of the normal axis of the target pixel.

3. An intra-field interpolation device for converting an interlaced video signal to a de-interlaced video signal, the device comprising:
    a first pixel difference unit receiving an image field of the interlaced video signal for determining a pair of pixel difference sets on either side of a normal axis of a target pixel in an alternate field of the interlaced video to thereby generate two candidate blending angles for the target pixel;
    a second pixel difference unit receiving the image field for determining two reference pixel differences in the image field being along a reference angle on either side of the normal axis of the target pixel;
    an angle selection unit being coupled to the first pixel difference unit and the second pixel difference unit for determining an optimal blending angle according to the two candidate blending angles determined by the first pixel difference unit, and the two reference pixel differences determined by the second pixel difference unit; and
    a weighted blending unit being coupled to the angle selection unit and receiving the image field for blending a plurality of pixel values in the image field along the optimal blending angle to thereby generate the target pixel in the de-interlaced video signal;
    wherein the angle selection unit includes an angle voting unit for determining the optimal blending angle further according to two previously utilized blending angles; wherein the two previously utilized blending angles correspond to blending angles for two previous pixels that were interpolated prior to the target pixel.

4. The device of claim 1, wherein the weighted blending unit is for performing weighted blending of a plurality of pixels values further along the normal axis to generate the target pixel.

5. The device of claim 4, wherein the weighted blending unit is for performing a two-phase weighting algorithm to interpolate the target pixel; pixel information along the normal axis being weighted according to a first weight, and pixel information along the optimal axis being weighted according to a second weight.

6. The device of claim 1, further comprising a low-pass filter for removing noise from the interlaced video signal.

7. The device of claim 1, wherein the first pixel difference unit is for utilizing a first pixel difference algorithm being substantially different from a second pixel difference algorithm utilized by the second pixel difference unit.

8. An intra-field interpolation method of converting an interlaced video signal to a de-interlaced video signal, the method comprising:
    receiving an image field of the interlaced video signal;
    utilizing a gradient unit for determining a gradient of a first line above a target pixel in the image field and a second line below the target pixel in the image field;
    utilizing a first pixel difference unit for determining a pair of pixel difference sets on either side of a normal axis of the target pixel in an alternate field of the interlaced video to thereby generate two candidate blending angles for the target pixel, wherein the two candidate blending angles for the target pixel are generated further according to the gradient;
    utilizing a second pixel difference unit for determining two reference pixel differences in the image field being along a reference angle on either side of the normal axis of the target pixel;
    utilizing an angle selection unit for determining an optimal blending angle according to the two candidate blending angles and the two reference pixel differences; and
    utilizing a blending unit for blending a plurality of pixel values in the image field along the optimal blending angle to thereby generate the target pixel in the de-interlaced video signal.

9. The method of claim 8, further comprising determining the two reference pixel differences being along a 45 degree reference angle on either side of the normal axis of the target pixel.

10. An intra-field interpolation method of converting an interlaced video signal to a de-interlaced video signal, the method comprising:
    receiving an image field of the interlaced video signal;
    utilizing a first pixel difference unit for determining a pair of pixel difference sets on either side of a normal axis of a target pixel in an alternate field of the interlaced video to thereby generate two candidate blending angles for the target pixel;
    utilizing a second pixel difference unit for determining two reference pixel differences in the image field being along a reference angle on either side of the normal axis of the target pixel;
    utilizing an angle selection unit for determining an optimal blending angle according to the two candidate blending angles and the two reference pixel differences, and
    further according to two previously utilized blending angles; wherein the two previously utilized blending angles correspond to blending angles for two previous pixels that were interpolated prior to the target pixel; and utilizing a blending unit for blending a plurality of pixel values in the image field along the optimal blending angle to thereby generate the target pixel in the de-interlaced video signal.

11. The method of claim 8, further comprising performing weighted blending of a plurality of pixels values further along the normal axis to generate the target pixel.

12. The method of claim 11, further comprising performing a two-phase weighting algorithm to interpolate the target pixel; pixel information along the normal axis being weighted according to a first weight, and pixel information along the optimal axis being weighted according to a second weight.

13. The method of claim 8, further comprising removing noise from the interlaced video signal.

14. The method of claim 8, further comprising utilizing a first pixel difference algorithm to determine the pair of pixel difference sets being substantially different from a second pixel difference algorithm utilized to determine the two reference pixel differences.

* * * * *